(12) United States Patent
McDonald

(10) Patent No.: US 7,116,378 B1
(45) Date of Patent: Oct. 3, 2006

(54) COLOR-BALANCED BRIGHTNESS ENHANCEMENT FOR DISPLAY SYSTEMS

(75) Inventor: David C. McDonald, Longmont, CO (US)

(73) Assignee: Displaytech, Inc., Longmont, CO (US)

( * ) Notice: Subject to any disclaimer, the term of this patent is extended or adjusted under 35 U.S.C. 154(b) by 673 days.

(21) Appl. No.: 09/923,920

(22) Filed: Aug. 7, 2001

Related U.S. Application Data

(60) Provisional application No. 60/225,432, filed on Aug. 15, 2000.

(51) Int. Cl.
*H04N 9/12* (2006.01)

(52) U.S. Cl. .......................................... 348/743; 353/84

(58) Field of Classification Search ................ 348/742, 348/743, 744, 750, 752, 687; 353/31, 84; 359/589, 590
See application file for complete search history.

(56) References Cited

U.S. PATENT DOCUMENTS

| | | | |
|---|---|---|---|
| 2,295,443 A | 9/1942 | Wilson | 178/5.2 |
| 2,317,989 A | 5/1943 | Goldmark | 178/5.2 |
| 2,466,021 A | 4/1949 | Goldmark | 178/5.4 |
| 2,493,200 A | 1/1950 | Land | 88/112 |
| 2,878,309 A | 3/1959 | Christensen | 178/5.4 |
| 2,880,267 A | 3/1959 | Goldmark et al. | 178/5.4 |
| 4,200,883 A * | 4/1980 | Yamanaka et al. | 348/237 |
| 4,600,274 A | 7/1986 | Morozumi | 350/339 |
| 4,907,862 A | 3/1990 | Suntola | 349/61 |
| 5,233,385 A | 8/1993 | Sampsell | 355/35 |
| 5,448,314 A | 9/1995 | Heimbuch et al. | 348/743 |
| 5,528,393 A | 6/1996 | Sharp et al. | 359/53 |
| 5,654,756 A | 8/1997 | Takahashi et al. | 348/268 |
| 5,668,572 A | 9/1997 | Meyer et al. | 345/150 |
| 5,680,180 A | 10/1997 | Huang | 348/656 |
| 5,686,931 A | 11/1997 | Funfschilling et al. | 345/88 |
| 5,751,384 A | 5/1998 | Sharp | 349/18 |
| 5,777,694 A | 7/1998 | Poradish | 348/743 |
| 5,777,707 A | 7/1998 | Masaki et al. | 349/110 |
| 5,863,125 A * | 1/1999 | Doany | 353/84 |
| 5,921,650 A * | 7/1999 | Doany et al. | 353/31 |
| 5,969,868 A * | 10/1999 | Bornhorst et al. | 359/589 |
| 6,002,452 A * | 12/1999 | Morgan | 348/742 |
| 6,091,462 A | 7/2000 | Sharp et al. | 349/19 |
| 6,097,367 A | 8/2000 | Kuriwaki et al. | 345/110 |
| 6,108,053 A * | 8/2000 | Pettitt et al. | 348/743 |
| 6,115,016 A | 9/2000 | Yoshihara et al. | 345/88 |

(Continued)

FOREIGN PATENT DOCUMENTS

WO    WO 00/07172    7/1999

OTHER PUBLICATIONS

A. Kunzman, G. Pettitt, Texas Instruments, "White Enhancement for Color Sequential DLP," published in the 1998 SID Digest, p. 121.

(Continued)

*Primary Examiner*—Paulos M. Natnael
(74) *Attorney, Agent, or Firm*—Robert G. Crouch; Marsh Fischmann & Breyfogle, LLP

(57) ABSTRACT

A technique for providing a desired level of color balance in field sequential color systems with brightness enhancement. In color wheels having a spectrally-broad transmissive segment, the spectrally-broad segment has a transmittance that is selected to provide a desired level of color balance. This can include transmittance characteristics that are inversely related to the spectral characteristics of the light source or optics. In color switches, this can include varying the amplitude and time duration of the contribution from each of the three primary colors.

18 Claims, 9 Drawing Sheets

U.S. PATENT DOCUMENTS

| | | | |
|---|---|---|---|
| 6,151,004 A | 11/2000 | Kaneko | 345/88 |
| 6,208,393 B1 * | 3/2001 | Bawolek et al. | 349/106 |
| 6,243,148 B1 | 6/2001 | Kaneko et al. | 349/61 |
| 6,256,073 B1 * | 7/2001 | Pettitt | 348/743 |
| 6,256,425 B1 | 7/2001 | Kunzman | 382/274 |
| 6,309,071 B1 * | 10/2001 | Huang et al. | 353/31 |
| 6,324,006 B1 * | 11/2001 | Morgan | 359/618 |
| 6,392,620 B1 | 5/2002 | Mizutani et al. | 345/88 |
| 6,392,717 B1 * | 5/2002 | Kunzman | 348/744 |
| 6,417,892 B1 * | 7/2002 | Sharp et al. | 348/742 |
| 6,490,017 B1 * | 12/2002 | Huang et al. | 349/97 |
| 6,570,554 B1 | 5/2003 | Makino et al. | 345/102 |
| 6,768,481 B1 * | 7/2004 | Ozawa et al. | 345/87 |
| 6,795,140 B1 * | 9/2004 | Shigeta | 349/106 |

OTHER PUBLICATIONS

A.N. Brinson, A. D. Edgar, "Liquid Crystal Apparatus for Converting Black and White CRT Display into Colored Display," published in the IBM Technical Disclosure Bulletin vol. 22, No. 5, Oct. 1979.

P. C. Goldmark, J. N. Dyer, E. R. Piore, J. M. Hollywood, "Color Television—Part I," published in Proceedings of the I.R.E., Apr. 1942.

* cited by examiner

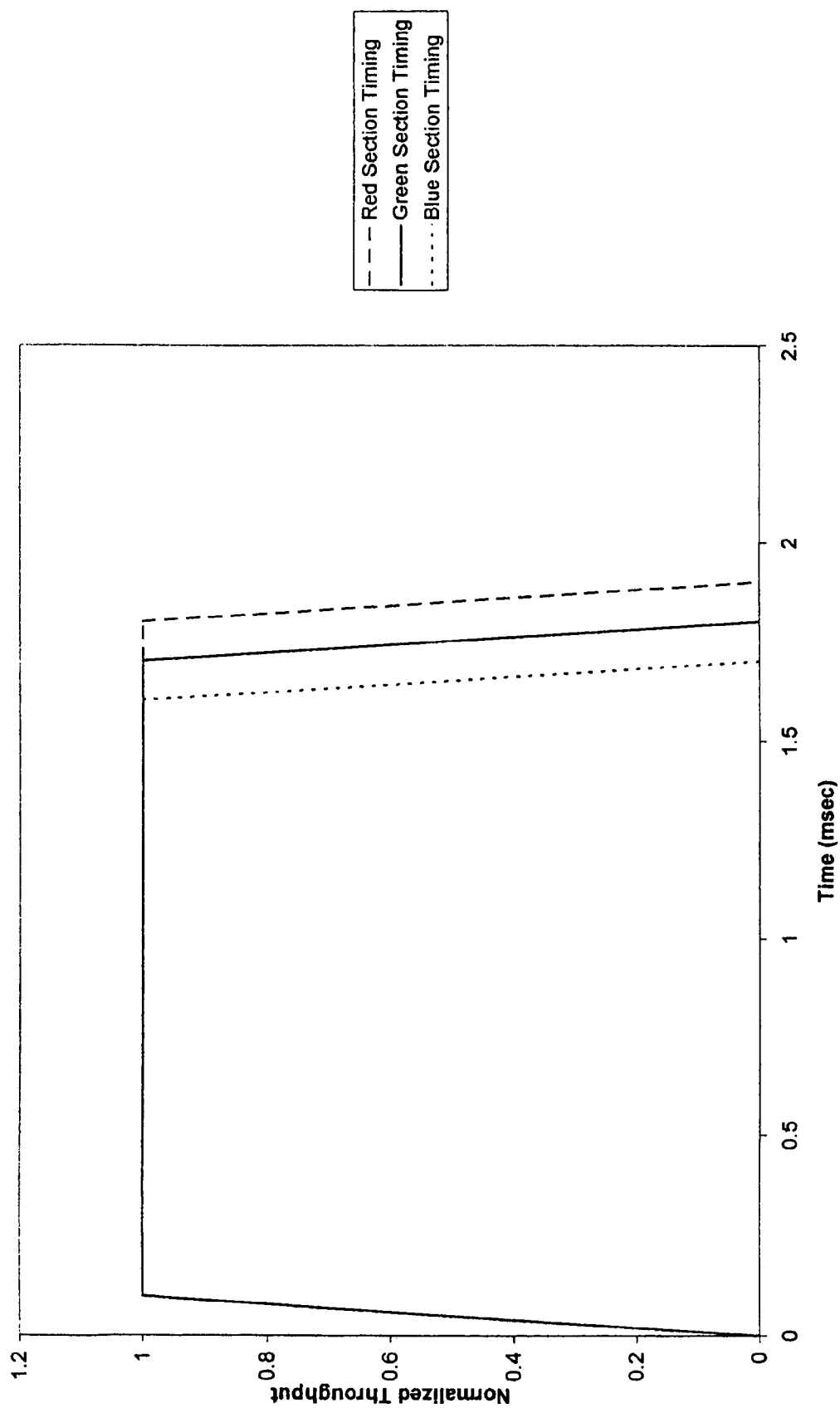

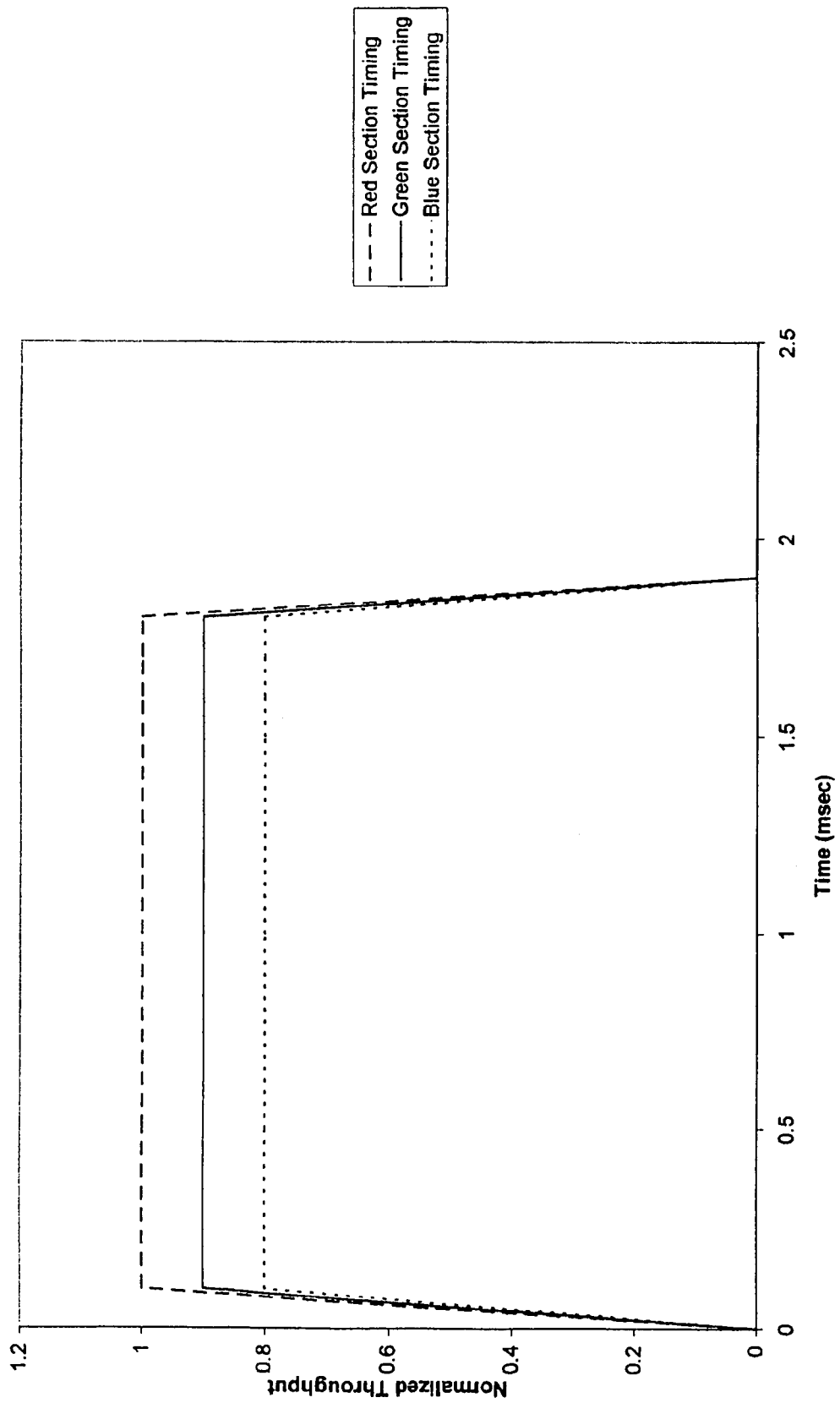

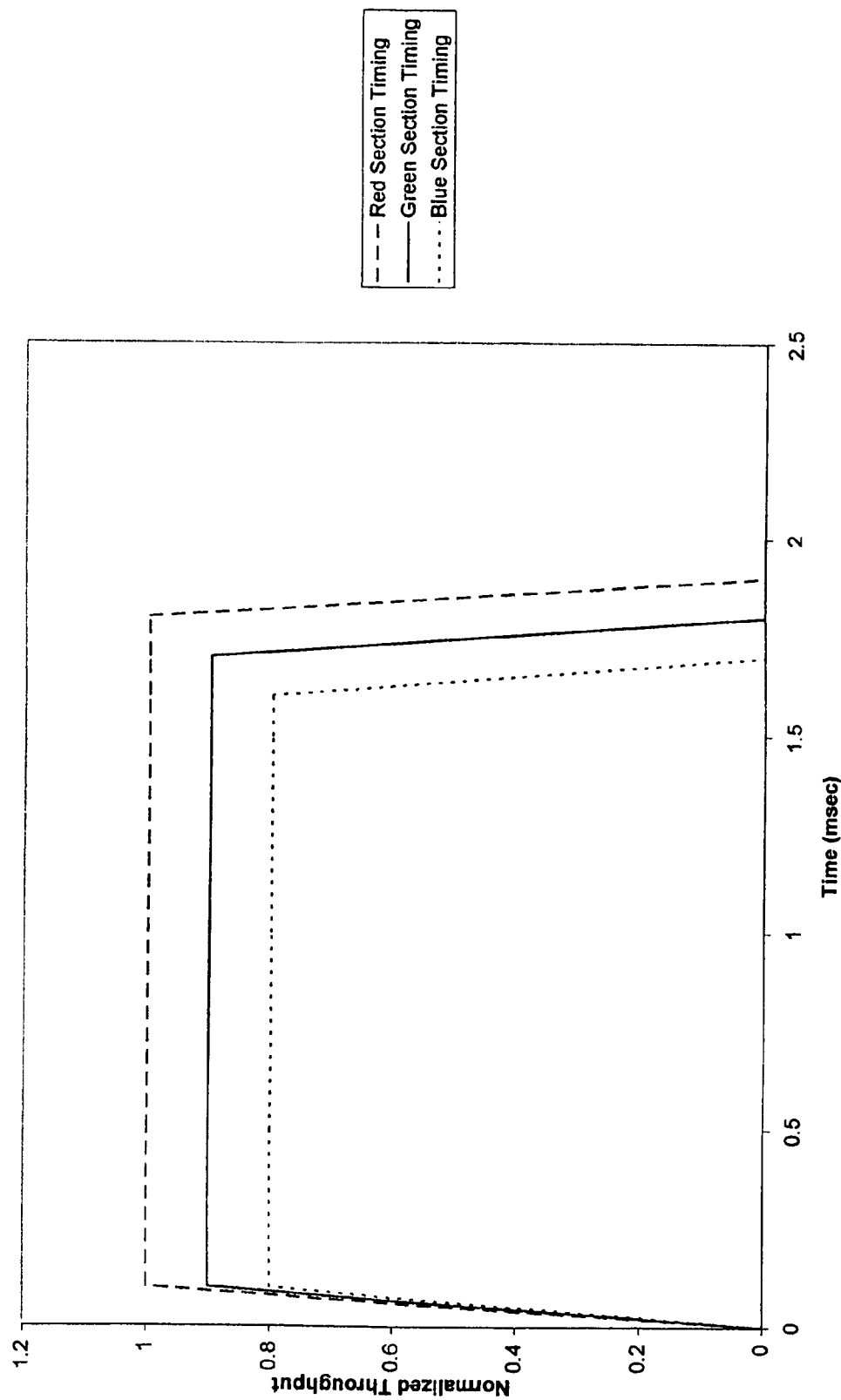

COLOR-BALANCED BRIGHTNESS ENHANCEMENT FOR DISPLAY SYSTEMS

This application claims the benefit of U.S. Provisional Patent Application No. 60/225,432, filed Aug. 15, 2000.

The present invention relates generally to display systems utilizing field sequential color separating devices such as color wheels or color switches for example, and more particularly, to a system and method for enhancing the brightness of a field sequential display device while maintaining the overall color balance of the image on the display.

BACKGROUND OF THE INVENTION

Color display systems have employed any of a variety of means for supplying the color component of an image. This includes systems that simply project light through a color transparency onto a projection surface. It includes cathode ray tubes (CRTs) with an array of areas of red, green, and blue phosphor that can be activated by electron beams as are commonly used in many color televisions and computer monitors. Of course, almost any color can be created by selecting the appropriate relative intensities of these three primary colors. Many front and rear projection display systems have three separate CRTs, one for each of red, green, and blue. In another type of projection system, the image is formed by reflecting light off of a spatial light modulator (SLM) that can be externally controlled to effectively turn on or off each of the small picture elements (pixels) of the SLM. Color is provided in such a system either by sequentially providing red, green, and blue light to the SLM or by utilizing three separate SLMs, one for each of red, green, and blue, and superimposing the image from the three SLMs to create the full color image. One method of sequentially providing red, green, and blue light to the SLM is by placing a rotating wheel having three segments disposed around its periphery, each being a filter to provide one of the three primary colors, in front of a white light source to selectively filter the white light into the three primary colors. This is a type of field sequential color system.

Field sequential color display systems using color wheels date back to the earliest days of the development of color television in the United States. At one time in the early 1950s the Federal Communications Commission issued a report (Public Notice 50-124) formally adopting a field sequential display system developed by the Columbia Broadcasting System as the US standard for color broadcasting. While this decision was eventually rescinded, field sequential color display devices based on the color wheel have continued to appear in the marketplace. Most recently a number of display manufacturers have offered front projectors using field sequential color generated by a color wheel to generate images for display to audiences.

Generation of images for display to groups of people requires great attention to detail in the design of the generating equipment. Typical goals include achieving high contrast, brightness, sufficient color saturation and balance, minimal artifacts, and clear, crisp images. Achieving suitable brightness while maintaining color balance has been a particularly difficult goal and is an objective of the present invention.

For example, U.S. Pat. Nos. 5,668,572 and 5,680,180 teach a color wheel with three color filter segments, where the relative size of each of the three color filters can be selectively optimized to achieve a desired color output. While this may provide the desired color, it does not address the brightness issue that is inherent to many projection display applications.

As is known, there are different aspects of color balance to consider in displays. One is to achieve the correct relative balance between the primary colors of red, green, and blue so that multicolor images assembled from these primary colors appear to be correct as well. In other words, this type of color balancing is based on human perception. The color balance of a system is often expressed as a triangle drawn on a CIE 1931 Standard Observer chart in the form of a coordinate pair for each color. A different perspective to color balancing is to achieve the correct color temperature as measured by instruments and expressed in degrees Kelvin. This is most often described as the white point color temperature for a display and it provides an important reference to users on the acceptability of the display for various applications and to different cultural groups.

Background to this invention is also found in U.S. Pat. No. 5,233,385, where brightness enhancement for sequential and spatial display systems is taught by adding to the system a non-filtered, transparent segment in addition to the three color filter segments that each pass a single color of light while reflecting or absorbing the remaining light, such as is shown in FIG. 1. While this is understood to increase the brightness of the image, it does not address controlling the nature of the light that passes through the transparent segment and that eventually appears on the projection surface.

For at least two reasons, providing a transparent section in a color wheel may be less than desirable. First, the illuminating light source may produce light that is not truly achromatic, meaning it does not have equal perceived intensity across the color spectrum of visible light. For example, some light sources have a spike in the yellow wavelength region. Second, since as discussed above the "whiteness" perceived by a human may be different than that measured by color temperature, it may be desirable to provide light that is not actually white light as measured but will be perceived as white by a human.

None of the approaches taught in the prior art address the issue of the color balancing of a brightness-enhanced image where the brightness enhancement is the result of addition of a transparent segment to the color wheel. The solution for the color balancing of a transparent segment differs from that of balancing the individual colors in that the color of the image created a transparent segment cannot be controlled by any form of temporal adjustment such as modifying the time of modulation or the relative size of the transparent segment. Rather, the color balance of that transparent segment will be determined by the spectrum of the illumination source and the relative spectral absorption characteristics of the remainder of the projection system between the lamp and the final projected image.

The technological area of Field Sequential Color (FSC) and FSC Projection is replete with terminology. Because the terminology has not become entirely standard within the industry the following definitions and clarifications are provided.

DATA FRAME (Input) is one set of input data delivered from the front end of the display system to the back end of the display system. A typical data frame rate is 60 frames per second.

COLOR FIELD (Output) is one set of data derived from the Data Frame for delivery by the back end of the display system to the display panel to enable the display panel to generate images for that one color. In a typical field sequential color system at least one color field is delivered to the display panel for each primary color included in the system design. In many systems additional color fields are delivered to the panel for each data frame. In a typical system the color field rate may be 360 fields per second.

SUMMARY OF THE INVENTION

The present invention relates to a color sequencing system for receiving visible Flight having a significant luminance across the visible light spectrum and for selectively transmitting light with an emphasis on different portions of the spectrum. The system includes a segmented color wheel having four segments, with three of the segments being primarily transmissive in only a portion of the wavelength spectrum of visible light. The portion for each of the three segments is not identical. One of the segments is broadly transmissive across the wavelength spectrum of visible light, the broadly-transmissive segment having a transmittance that is not uniform across the wavelength spectrum of visible light so as to provide a desired color of light transmitted therethrough. The system also includes a base to which the color wheel is rotatably mounted.

The color sequencing system may be optimized for use with a particular light source by selecting the transmittance of the broadly-transmissive segment so as to provide a substantially uniform light output after the light from the light source has passed through the broadly-transmissive segment. The spectral transmittance of the broadly-transmissive segment may be substantially the inverse of the spectral light output from the light source. The spectral transmittance of the broadly-transmissive segment may be attenuated in some portion of the wavelength spectrum of visible light. The spectral transmittance of the broadly-transmissive segment may be notched in some portion of the wavelength spectrum of visible light. The three segments may transmit light that is primarily red, green, and blue, respectively.

The present invention also relates to a method of creating field sequential color images. The method includes providing a light source, a color sequencer, and a spatial light modulator. The method also includes providing light of primarily one color band from the combination of the light source and the color sequencer while the spatial light modulator displays an image corresponding to that color band; providing light of primarily a second color band from the combination of the light source and the color sequencer while the spatial light modulator displays an image corresponding to that second color band; and providing light of primarily a third color band from the combination of the light source and the color sequencer while the spatial light modulator displays an image corresponding to that third color band. The method also includes providing spectrally-broad light from the combination of the light source and the color sequencer while the spatial light modulator displays an image corresponding to that spectrally-broad light, wherein the spectrally-broad light has desired spectral characteristics as a result of the combination of the light source and the color sequencer.

The light source may provide light that is substantially non-uniform spectrally and the color sequencer may have a corresponding transmittance that is substantially non-uniform spectrally. The corresponding transmittance may be attenuated in spectral regions where the light from the light source is elevated. The non-uniformities of the light from the light source and the corresponding transmittance from the color sequencer may be inversely related. The images to be displayed may be based on input data and the displayed image corresponding to the spectrally-broad light may be derived from the input data and the displayed images corresponding to each color band are adjusted accordingly. The spatial light modulator may be pixelated and the input data may be provided in frames of data specifying the color and brightness for each pixel of the spatial light modulator for each frame and for each frame a spectrally-broad component may be derived from the color and brightness information and this spectrally-broad component is used to create the displayed image corresponding to the spectrally-broad light.

The color sequencer may include a color wheel. The color wheel may include a broadly-transmissive segment with non-uniform spectral transmittance. The color sequencer may include birefringent liquid crystal materials that can be controlled to produce light of any combination of at least three different color bands. The spectrally-broad light may be provided from the color sequencer by combining light from each of the three color bands. The particular spectral characteristics of the spectrally-broad light may be achieved by controlling one or both of the amplitude and time duration of light from a particular color band.

BRIEF DESCRIPTION OF THE DRAWINGS

FIG. 7 is a graphical representation of time weighted color balancing with the color selection component of FIG. 6.

FIG. 8 is a graphical representation of amplitude weighted color balancing with the color selection component of FIG. 6.

FIG. 9 is a graphical representation of time and amplitude weighted color balancing with the color selection component of FIG. 6.

DETAILED DESCRIPTION OF THE INVENTION

The object of this invention is to enable display systems utilizing brightness enhancement to operate in a more efficient manner that is more pleasing to end users than the prior art systems. Non-emissive display systems using lamps include at a minimum: an illumination source such as a lamp; a color separating device that may be temporal or spatial or both; one or more image generating devices, such as liquid crystal or deformable micromirror devices although not limited to such devices; components to deliver the illumination to the image generating device; and components to deliver the generated image to a viewing surface. Other devices and components may also be required or may offer improved efficiency; the discussion is not intended to be limiting.

Some sort of color separating device, whether temporal, spatial, or both, is an important part of color display systems that rely upon illumination separate from the image generating device. Achieving proper balance among the colors during the generation of images is important in that the resulting images may otherwise be perceived as being inaccurately represented. For example, skin tones may be perceived as being slightly off, or white images may have a slight coloration.

Figure 5:
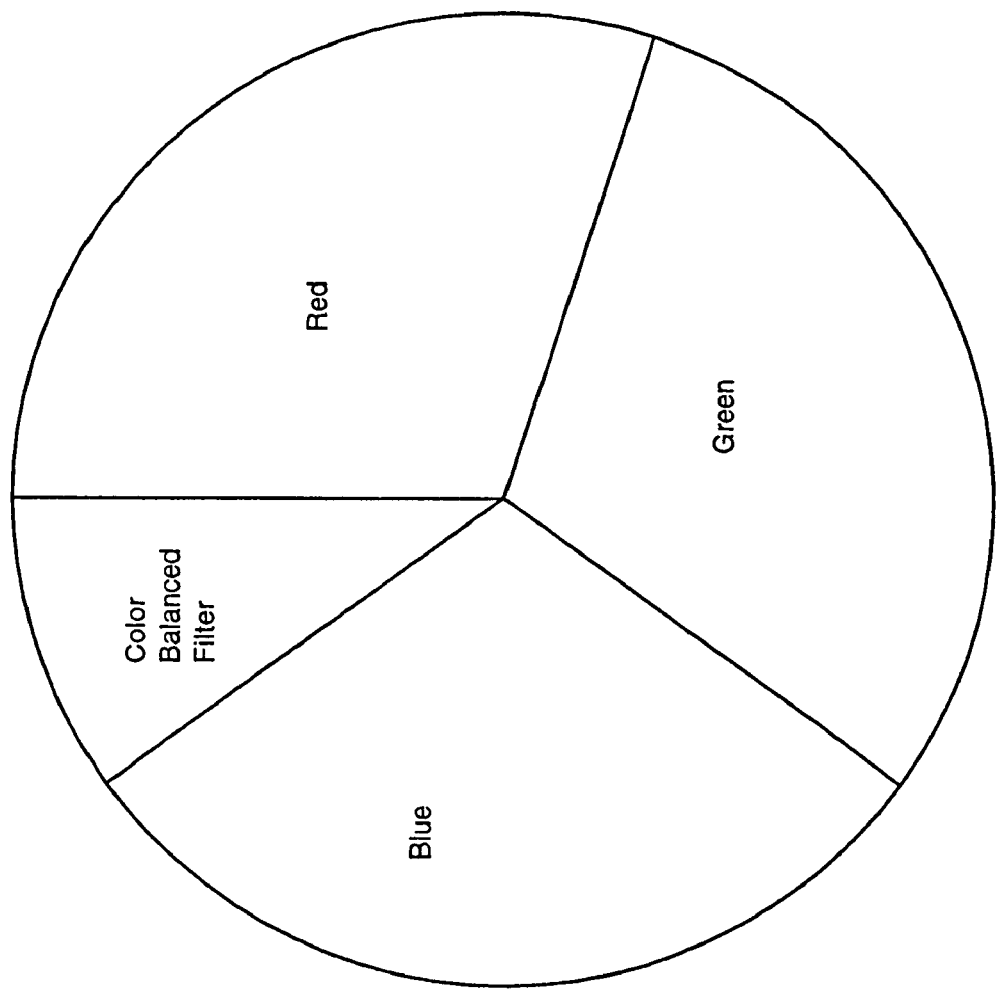
FIG. 5 is a diagram of a color wheel constructed according to the present invention showing three primary color filter segments and a tuned color balance filter segment.

The present invention includes methods for achieving color balance in display systems by designing and using a brightness-enhancing, broad-spectrum, color-balanced filter in addition to the three primary color filter segments. Such display systems may include a broad-spectrum filter segment on a color wheel as is shown in FIG. 5, other field sequential color separating device, or spatially separated color separating device that is not inherently field sequential. The color-balanced filter has generally broad transmissivity across the color spectrum while providing a desired filtered output to correspond to a desired color balance as displayed. The color-balanced filter is also intended to increase the overall brightness of the projected image. The methods described hereafter may be applied to a display system regardless of the desired desaturation of the colors and regardless of the design color temperature of the primary colors created by the other filter segments.

First, the desired color balance for the color-balanced filter is defined in terms of a white point color temperature desired for the white point and in terms of a desired ratio of the powers of the colors within the filter segment. The color-balanced filter is not notched spectrally to allow substantially only light of a single primary color range to pass through in the way that the primary color filter segments of a color wheel is most often done. For this reason, the determination of the white point color temperature may be the more meaningful of the two. Any other suitable means for defining the spectral transmissivity characteristics of the color-balanced filter could also be employed.

Next the designer must select a material to use. Models are commonly available to assist the system developer in designing this. Commonly, dichroic filters are used because well-designed dichroic filters normally reflect substantially all light not transmitted through the filter. As a result, such materials normally have longer lifetime than absorptive type filters although absorptive filters could certainly perform the function as well. Any other suitable filter material could be employed as well.

Figure 4:
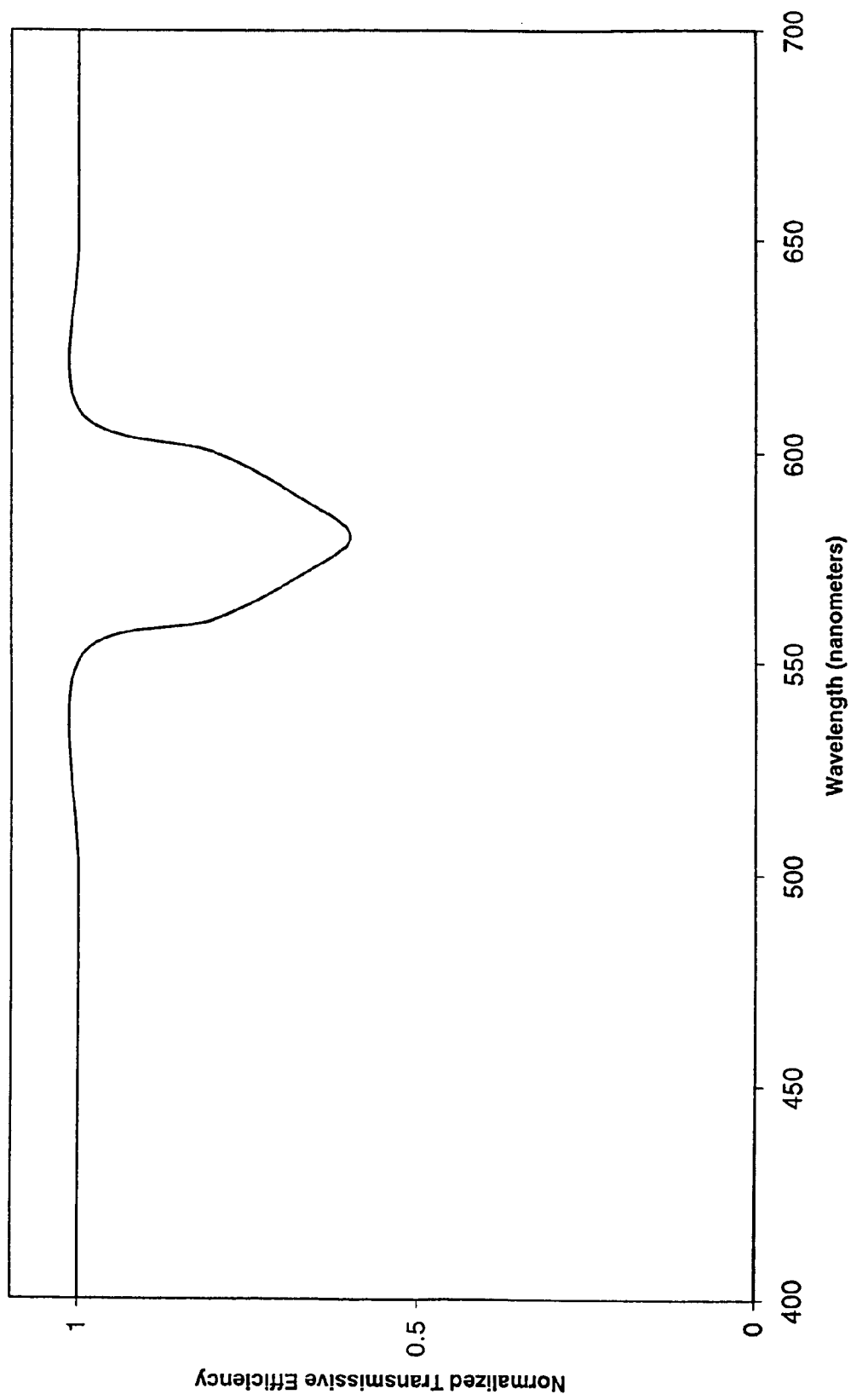
FIG. 4 is a graph of the normalized transmissive efficiency versus wavelength, in nanometers, of a yellow notch filter as could be utilized in the present invention.

The color-balanced filter could function by notching out a spectral line from the spectrum of the lamp. This is illustrated in FIG. 4, in which a yellow notch filter centered on 580 nanometers is shown, the normal position of one visible light spike generated by lamps using mercury under high pressure. Of course, any other type of notch filter could be employed at this or any other suitable wavelength region.

Figure 1:
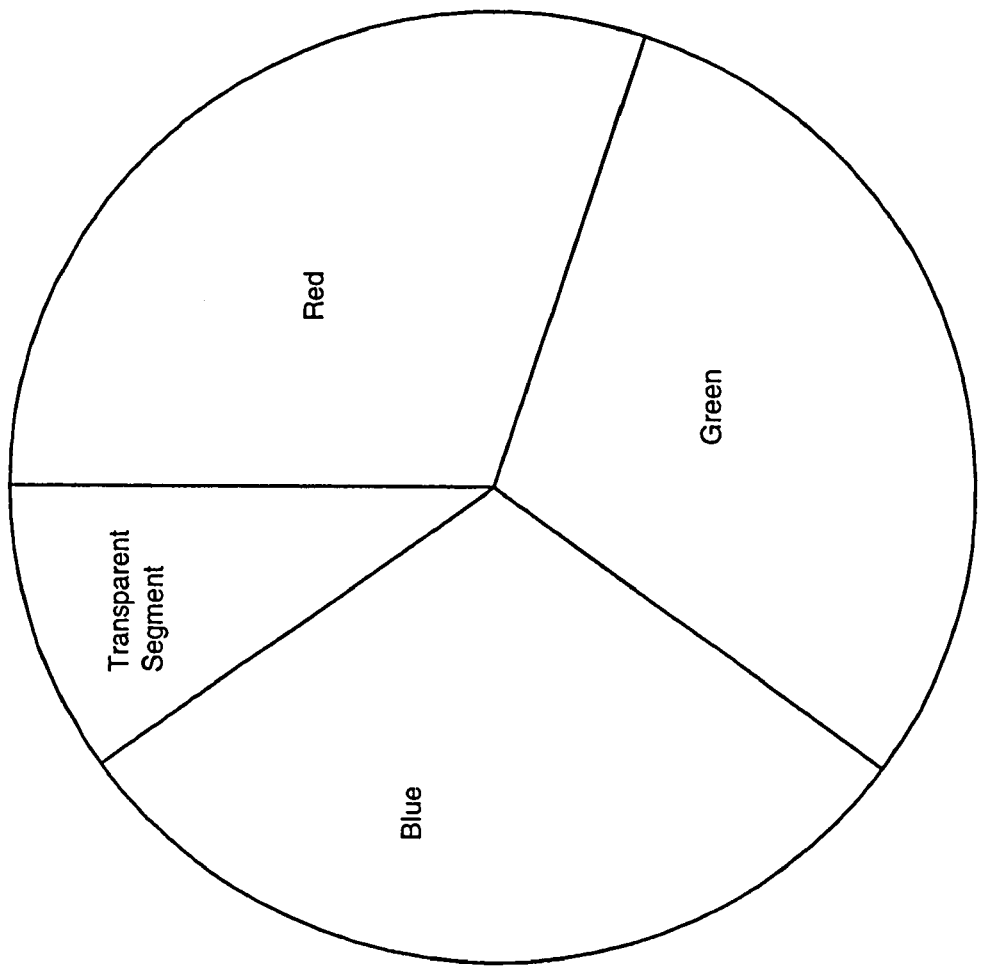
FIG. 1 is a diagram of a prior art color wheel showing three primary color filter segments and one unfiltered transparent segment.
Figure 2:
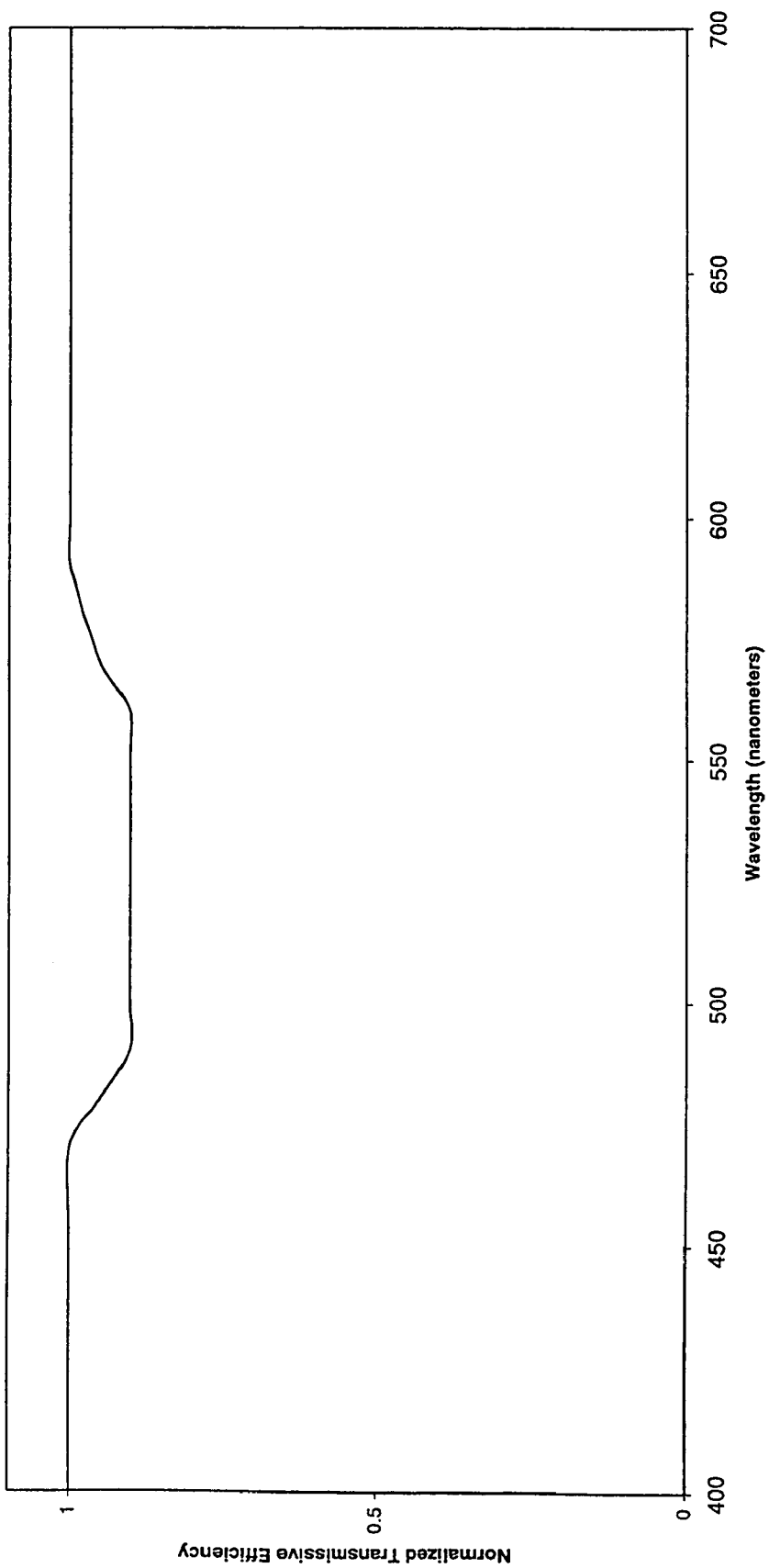
FIG. 2 is a graph of the normalized transmissive efficiency versus wavelength, in nanometers, of a green attenuation filter as could be utilized in the present invention.
Figure 3:
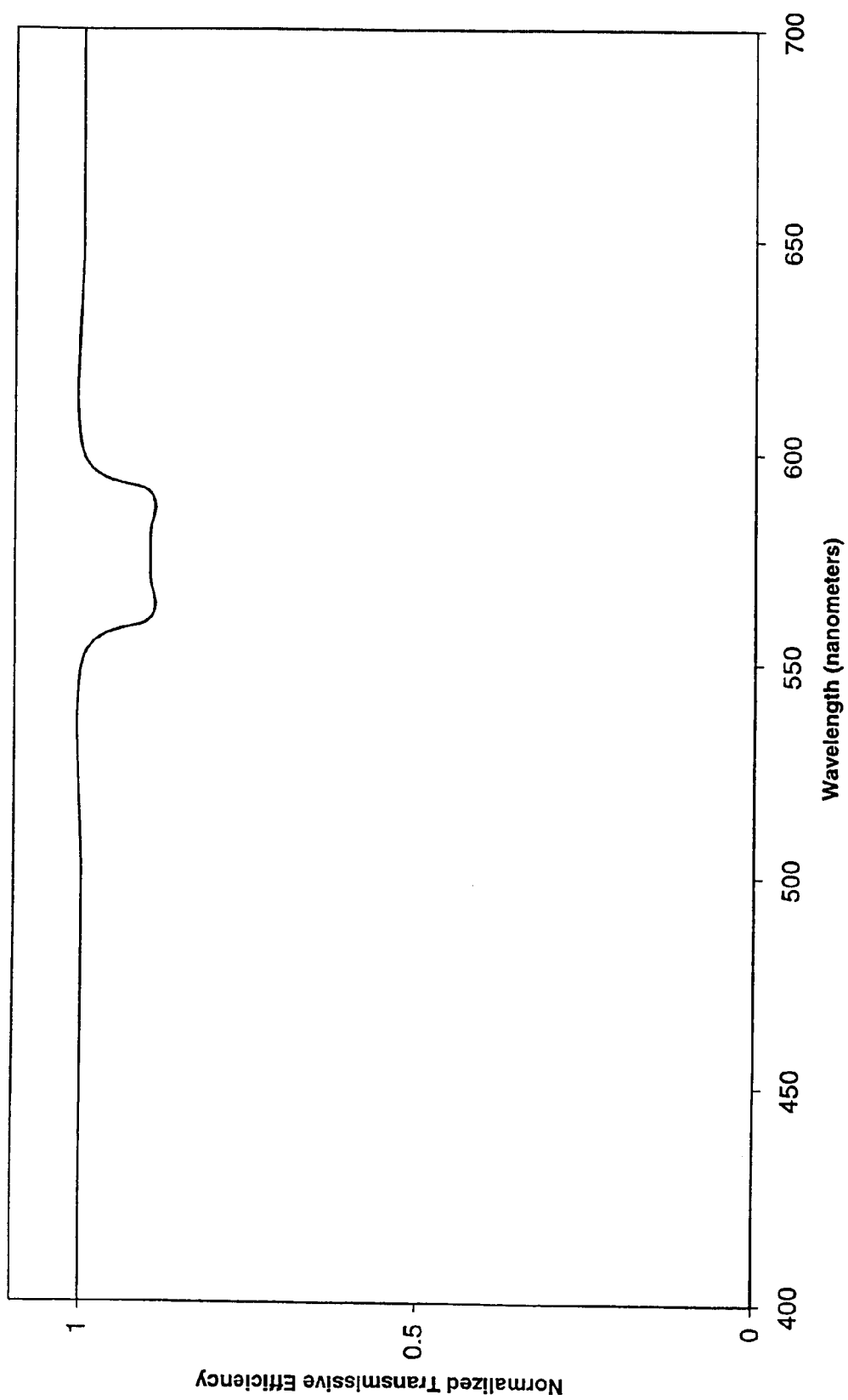
FIG. 3 is a graph of the normalized transmissive efficiency versus wavelength, in nanometers, of a yellow attenuation filter as could be utilized in the present invention.

Alternatively, the color-balanced filter could function by attenuating a color band such as green by the necessary amount. This is illustrated in FIG. 2, in which a green band filter is shown attenuating the intensity of the 490 to 550 nanometer wavelength region by approximately 10% relative to the remainder of the spectrum. It is also shown in FIG. 3, in which a yellow band filter is shown attenuating the intensity of the 560 to 590 nanometer wavelength region by approximately 10% relative to the remainder of the spectrum. Of course, any other type of band filter could be employed at these or other wavelength regions.

In a third alternative that is not shown, the attenuated color band may extend across primary color bands. Other alternatives such as attenuation of two color bands are all practical within the filter design. Specific designs may reflect choices made on detailed market analyses and the like or alternatively by cost of design and manufacture of the filter. Common sources for such filters include Unaxis (formerly Balzers) and Optical Coatings Laboratory Inc. (OCLI).

As can be appreciated, when the present invention is applied to color wheels, the spectral characteristics of the color-balanced filter can be optimally selected so that, after light from the light source passes through the filter, illuminates the spatial light modulator, and appears at the viewing area or screen, the light is of a desired color. This optimal selection may include considerations such as the spectral output of the light source, the spectral characteristics of any optics in the system, the color balance most pleasing to the human viewing the image, and so forth.

As an alternative to using the present invention with color wheels, the present invention could also be employed with other field sequential color separating devices. In U.S. Pat. Nos. 5,528,393, 5,751,384, and 6,091,462 and in PCT Publication WO 00/07172, among others, Sharp and Johnson teach devices using liquid crystal devices in combination with retarder stacks that modulate linearly polarized or partially linearly polarized white light to provide a switchable output of individual polarized primary colors, such as red, green, and blue. Another example of this type device is taught by Fünfschilling et al. in U.S. Pat. No. 5,686,931. That particular device may accept unpolarized, linearly polarized or circularly polarized white light and deliver circularly polarized colored light at the output. Other designs for color sequencing devices exist in the patent literature that may also be used in the manner described below. The principal common feature in these devices is that the filter sections are normally deployed in a serial manner relative to the light path and each filter is activated separately, normally by some type of electrical signal or drive waveform, to pass or block the passage of light of a designed spectrum. Most such field sequential color separating devices are designed such that more than one filter segment can be driven simultaneously to enable passage of more than one primary color spectrum of light simultaneously. Each of the patents and publications mentioned in this paragraph are incorporated herein by reference.

A logical consequence of these teachings is that the individual primary color sections within the light separating device may be activated together to create color-balanced broad-spectrum illumination during the time that all are activated. These sections may be operated simultaneously or near simultaneously to create an analogue to a white segment in a color wheel with the principal difference being that, in many instances, whatever filtering takes place in the individual color segments is somehow represented in the composite white spectrum. This would normally be manifested as notches of some type in the spectrum between the primary colors. There are specific exceptions to this that those skilled in the art will recognize.

The same difficulties can exist with the use of such devices that are found in the approach taught in U.S. Pat. No. 5,233,385. It is likely that when all filter segments are activated together that the resultant light deviates from the desired color temperature of light for broad spectrum light.

In those instances remedies also exist that will result in a better color balance in the design point.

Sharp and Johnson teach the use, in various patents, of numerous different electro-optic devices as the switchable optical retarding device in these color separating devices. These may be classified broadly (and somewhat simplistically) into two classes of devices. One type of device has constant retardance and the orientation of the axes of retardance may be rotated within the cell. In a second type of device the axes of retardance are fixed and the birefringence of the cell may be varied by varying the drive voltage. The surface stabilized ferroelectric liquid crystal (SSFLC) cell is an example of the former. (One special feature of the SSFLC cell is that it can be driven, in saturation, between two fixed retarder angles.) The twisted nematic and pi-cell (also nematic) (alternatively called OCB cell or Optically Compensated Bend cell) are examples of the latter. Those skilled in the art of liquid crystal science may recognize variations and nuances upon the descriptions rendered. The descriptions and examples are not intended to be limiting.

Fünfschilling et al. (referenced above) teach the use of the Distorted Helix Ferroelectric (DHF) cell as a switching device. The DHF cell acts as a constant retardance cell where the angle of orientation of the retarder changes approximately linearly as a function of the drive voltage.

Figure 6:
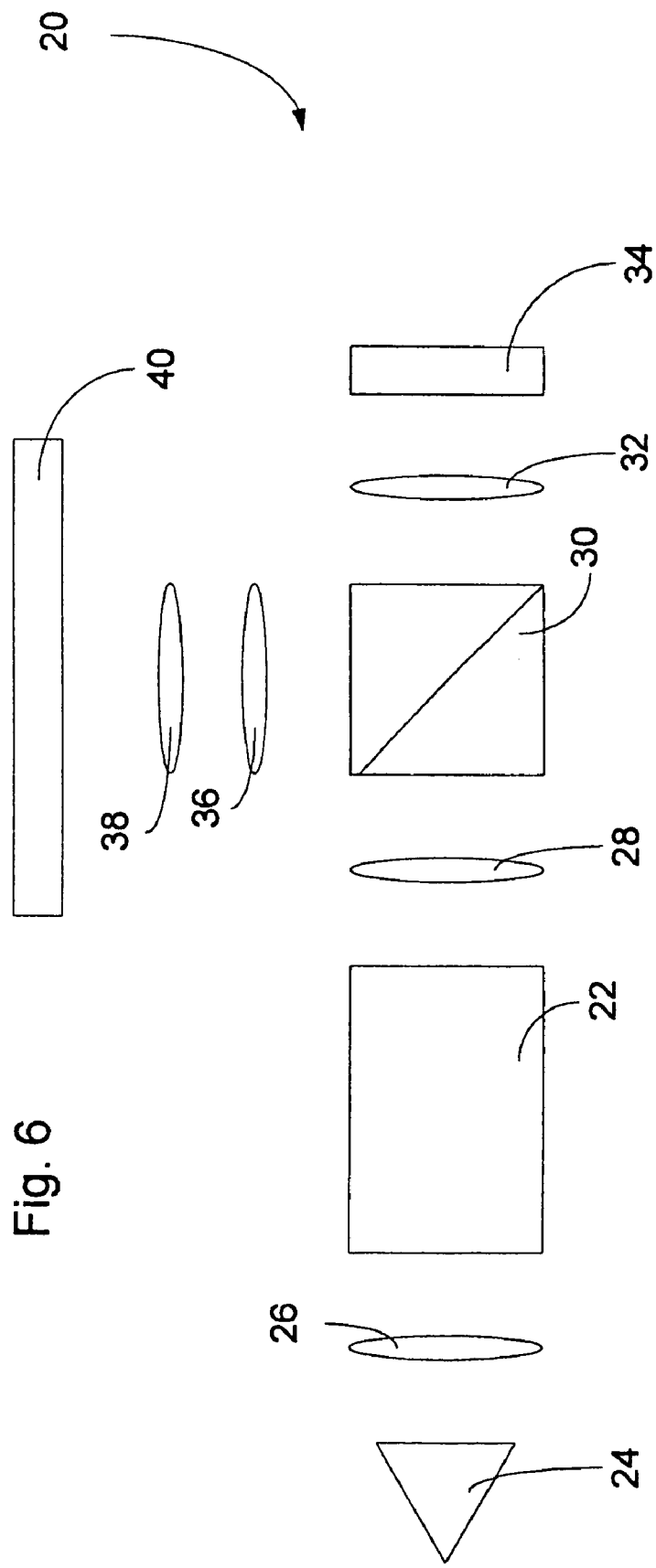
FIG. 6 is a schematic diagram of an electro-optical system constructed in accordance with the present invention in which the color selection component is operative to provide color balancing.

FIG. 6 shows an exemplary electro-optical system 20 in which a color selection component 22 could operate in accordance with the teachings of the present invention. The color selection component 22 could be a color wheel, a color switch, or another device for selectively producing colored light from spectrally-broad light. A lamp 24, which may have a spike in its spectral distribution, radiates light through a first lens 26 to the color selection component 22, such as that described above. The color selection component 22 operates to sequentially allow light of each of the primary colors to pass therethrough. In addition, the color selection component 22 can, through selecting each of the three primary colors simultaneously, allow color balanced light to pass therethrough as part of a brightness enhancement frame. Each of these field sequential frames or time segments of light pass through a second lens 28, a beamsplitter 30, a third lens 32, and then are selectively reflected off of a microdisplay 34, possibly on a pixelated basis. The reflected light passes back through the third lens 32 and is reflected by the beamsplitter 30 through two more lenses 36 and 38 toward a viewer or projection surface 40.

The first method of achieving color balance in such devices applies to those with liquid crystal devices where controlling the amplitude of the drive voltage applied to the cells can control the effective performance (or optical throughput). This would apply to those cells with variable birefringence, such as the pi-cell and the twisted nematic cell as well as to the DHF cell. In this instance, color balance in the broad-spectrum frame could be achieved by using the voltage control effect to reduce the throughput on one or more color channels until the desired balance based on the system design is achieved. This reduced voltage could be applied throughout the duration of the color-balanced brightness enhancement frame.

FIG. 8 illustrates an instance where it is desirable to compensate for an excess of blue relative to green and an excess of green relative to red. In this instance, a reduction in the amplitude of the blue throughput and a somewhat lesser reduction in green throughput optimize the color balance of the system. The blue section is turned on to 0.8 of its normalized maximum throughput while the green section is turned on to 0.9 of its normalized maximum throughput. Red is left at its maximum output. The combination of these primary colors at these amplitudes provides the desired color balance in the brightness enhancement frame. A diagram analogous to FIG. 2, for example, would present three different levels in the spectral regions corresponding to the primary colors, perhaps with notches in the regions between the primary colors A second method of achieving color balance could be applied to all devices. In this instance, all color filtering segments are turned on at the same time at full brightness and temporal modulation is applied to subsequently turn off individual colors at a later time during the duration of the data frame. In the simplest version, a color filter segment would be turned off once the time required to achieve balance for that color segment is complete. In other versions, the drive voltage for a given color may be modulated to drive that color off and then back on throughout the frame. In the case of nematic liquid crystal cells, this could result in an effect similar to the voltage modulation effect described in the first method above provided the time constant of the modulation is faster than the time constants associated with the liquid crystal. In the case of an SSFLC device, this modulation would turn the cell off momentarily.

FIG. 7 illustrates an instance where it is desirable to compensate for an excess of blue light relative to green light and an excess of green light relative to red light. In this instance, a reduction in the duration of the blue filter segment on time and a somewhat lesser reduction in the duration of the green filter segment on time optimize the color balance of the system. The blue filter segment is turned on for approximately 1.7 milliseconds, green for 1.8 milliseconds, and red for 1.9 milliseconds. The combination of these primary colors for these time durations provides the desired color balance in the brightness enhancement frame.

A third method of achieving color balance may be achieved by simultaneously applying both methods described above in some degree. Another more fundamental variation available with these types of devices is the ability to vary the length of the color-balanced segments according to various considerations, including the color makeup of the data being presented and according to the type data being presented. In some instances, it may be desirable to remove brightness enhancement completely from the images presented. North American audiences typically prefer not to have brightness enhancement when viewing projected images of theatrical performances and films whereas it is normally preferred when presenting computer screens and data files.

FIG. 9 illustrates an instance where it is desirable to compensate for an excess of blue relative to green and an excess of green relative to red. In this instance, a reduction in blue and a somewhat lesser reduction in green optimize the color balance of the system. The blue section is turned on to 0.8 of its normalized maximum. Additionally, the duration of the blue on time is shortened by 0.2 milliseconds relative to red. The green section is turned on to 0.9 of its normalized maximum and is shortened by 0.1 milliseconds relative to red. The red section is left at its maximum normalized throughput and set for a 1.9 millisecond duration. The combination of these primary colors at these amplitudes and for these time durations provides the desired color balance in the brightness enhancement frame.

These examples represent some portion of the methods available. It must be recognized that these methods exist in numerous minor variations obvious to those skilled in the art but not described here.

It can also be appreciated that image data presented to a display system for use in the creation of images may be initially formatted in a variety of methods. Examples of these are well known to those versed in the art. One common method for image data formatting is the use of 24-bit RGB data. Such 24-bit RGB data consist of 8 bits each for the primary colors red, green, and blue. The 8 bits for each primary color corresponds exactly to 256 levels of gray scale per color and thus to 16,777,216 colors for the composite color created from the three primary colors where each color differs from the other by at least one gray level in at least one constituent primary color. Display systems using other gray level resolutions and other numbers and types of primary colors, and so forth, are possible in practical systems existing now. This discussion is not intended to be limiting.

When this data is presented to a system of the type presented in this invention, an additional transformation of the data must take place. In the present example, the data for RGB must be transformed into data for RGBC, where R, G, and B are notations for red, green, and blue, respectively, and C is the notation for a color-balanced spectrum. This may be expressed, for example, as $f_n$ $(r_1, g_1, b_1) \Rightarrow (r_2, g_2, b_2, c_2)$, where $r_1$, $g_1$, and $b_1$ represent the gray scale levels in the input data and $r_2$, $g_2$, $b_2$, and $c_2$ represent the output of the transformation of the input data by $f_n$ and where $f_n$ may be a matrix transformation or some other suitable mathematical or mapping function that renders suitable gray levels based on systems design constraints, marketing goals, and the like. The functional form of transform $f_n$ will depend on the design details of the sequential color system. In particular, it will depend on the duration and the actual wavelength spectrum of the color-balance segment. Different choices of color balance segment spectrum and duration, each with their own appropriate form of transform $f_n$, may allow overall design of a display system meeting system design constraints and marketing goals.

One simple example of how this transform might function is that it might, for example, extract from the input data the lowest level color balanced spectrum data based on the lowest gray level of the constituents of the data, reduce the RGB components in the output data by this same amount, and ascribe this data to the W component. A sample calculation using this scheme would be $f_1$ (150, 255, 48) $\Rightarrow$ (102, 207, 0, 48). This simple algorithm, however, may result in reduced brightness rather than enhanced brightness in trivial cases. For example, in the case of $f_1$ (255, 255, 255) $\Rightarrow$ (0, 0, 0, 255), the result would clearly not be brighter. Thus a more complex algorithm is required for practical projection systems.

In a second, slightly more complex, algorithm, the lowest level color-balanced data may again be extracted but the reduction to the RGB components may be only a percentage of the low level color-balanced component. In the instance where this reduction is only 50% of the color-balanced spectral value, the transform would look like $f_2$ (150, 255, 48) $\Rightarrow$ (126, 231, 24, 48). Applying this to the case of maximum brightness would result in $f_2$ (255, 255, 255) $\Rightarrow$ (128, 128, 128, 255). This would be marginally brighter than the display without enhancement.

In a third example, the level of brightness enhancement could be calculated by averaging the bit weightings of each primary color without reduction to the values ascribed to the primary colors. Thus, taking the input data from the second example above, the new function would yield $f_3$ (150, 255, 48) $\Rightarrow$ (150, 255, 48, 151).

Thus more complicated transforms would obviously be required in display systems with brightness enhancement. One clear goal would be to require that white backgrounds be presented with full color intensity during the periods of single color illumination and also with full intensity during periods of color balanced illumination. This could be represented as $f_4$ (255, 255, 255) $\Rightarrow$ (255, 255, 255, 255). Other conflicting goals might require better color purity in other instances. The tradeoffs would require substantial experimentation with individual schemes.

Other factors requiring more complicated transforms could include convolving gamma correction factors to add bits or conducting a tradeoff between perceived brightness and perceived desaturation effects. The latter could be accomplished, for example, by setting the brightness enhancement level to the level of the green color grayscale, perhaps with some upward adjustment for instances where the other primary colors are more intense than green. These could be required by the type of data presented and by the demographics of the intended audience. For examples, it is generally known that systems to be sold for use with Asian audiences are typically set to a high color temperature on the white point than systems to be sold for use with North American audiences. Since many other factors exist, these examples are not intended to be limiting.

One essential element of the foregoing discussions is that the transform should be applied to the entire system and not merely to the input into the color-separating device. It is most important that the result be perceived as color balanced by the audience looking at the image. Because that perception is biased by culture, by age, and by other variances found within the human race, no single solution will be optimal in all instances.

Although the illustrations and descriptions herein may have implied the use of planar-shaped color wheels, the present invention is equally applicable to any other type of color wheel, such as drum-shaped or cylindrically-shaped color wheels (exemplified in U.S. Pat. Nos. 2,295,443 and 2,317,989), color wheels using cylinders having flattened sides (exemplified in U.S. Pat. No. 2,880,267), and conically-shaped color filters (exemplified in U.S. Pat. No. 2,466,021) for example. Each of these patents is incorporated herein by reference.

It can be appreciated from the foregoing that many other types of color-balanced filters, or combinations thereof, other than those discussed could be created that would fall within the scope and spirit of the present invention. It can also be appreciated that the color-balanced filters of the present invention meet the dual objectives of increased brightness while maintaining color balance of the image. Of course, the scope of the invention is reflected in the following claims and not limited by the above description and drawings.

The invention claimed is:

1. A color sequencing system for receiving visible light having a significant luminance across the visible light spectrum and for selectively transmitting light with an emphasis on different portions of the spectrum, the system comprising:
   a segmented color wheel having four segments, with three of the segments being primarily transmissive in only a portion of the wavelength spectrum of visible light, the portion for each of the three segments not being identical, and with a fourth segment being broadly transmissive across the wavelength spectrum of visible light, the broadly-transmissive segment having a transmittance at some wavelengths of visible light that is different from a transmittance at some other wavelengths of visible light so as to provide a desired color of light transmitted therethrough; and a base to which the color wheel is rotatably mounted;

wherein the color sequencing system is optimized for use with a particular light source by selecting the transmittance of the broadly-transmissive segment so as to provide a light output that is substantially uniform across the wavelength spectrum of visible light after the light from the light source has passed through the broadly-transmissive segment.

2. A color sequencing system as defined in claim 1, wherein the spectral transmittance of the broadly-transmissive segment is substantially the inverse of the spectral light output from the light source.

3. A method of creating field sequential color images, comprising:

providing a light source, a color sequencer, and a spatial light modulator;

providing light of primarily one color band during one time period from the combination of the light source and the color sequencer while the spatial light modulator displays an image corresponding to that color band;

providing light of primarily a second color band during a second time period from the combination of the light source and the color sequencer while the spatial light modulator displays an image corresponding to that second color band;

providing light of primarily a third color band during a third time period from the combination of the light source and the color sequencer while the spatial light modulator displays an image corresponding to that third color band; and providing spectrally-broad light during a fourth time period from the combination of the light source and the color sequencer while the spatial light modulator displays an image corresponding to that spectrally-broad light, wherein while providing the spectrally-broad light the color sequencer attenuates at least a portion of the light from the light source by a non-negligible amount, wherein the spectrally-broad light includes simultaneous and substantial amounts of red, green, and blue light, wherein the spectrally-broad light has desired spectral characteristics as a result of the combination of the light source and the color sequencer.

4. A method as described in claim 3, wherein the light source provides light that is substantially non-uniform spectrally and the color sequencer has a corresponding transmittance that is substantially non-uniform spectrally.

5. A method as described in claim 4, wherein the corresponding transmittance is attenuated in spectral regions where the light from the light source is elevated.

6. A method as defined in claim 3, wherein the non-uniformities of the light from the light source and the corresponding transmittance from the color sequencer are inversely related.

7. A method as defined in claim 6, wherein the spatial light modulator is pixellated and the input data is provided in frames of data specifying the color and brightness for each pixel of the spatial light modulator for each frame, and wherein for each frame a spectrally-broad component is derived from the color and brightness information and this spectrally-broad component is used to create the displayed image corresponding to the spectrally-broad light.

8. A method as defined in claim 3, wherein the images to be displayed are based on input data, and wherein the displayed image corresponding to the spectrally-broad light is derived from the input data and the displayed images corresponding to each color band are adjusted accordingly.

9. A method as defined in claim 3, wherein the color sequencer includes a color wheel.

10. A method as defined in claim 9, wherein the color wheel includes a broadly-transmissive segment with a non-uniform spectral transmittance.

11. A method as defined in claim 3, wherein the color sequencer includes birefringent liquid crystal materials that can be controlled to produce light of any combination of at least three different color bands.

12. A method as defined in claim 11, wherein the spectrally-broad light is provided from the color sequencer by combining light from each of the three color bands.

13. A method as defined in claim 12, wherein the particular spectral characteristics of the spectrally-broad light is achieved by controlling one or both of the amplitude and time duration of light from a particular color band.

14. A method as defined in claim 3, wherein the fourth segment transmits substantial amounts of light throughout the range of 450 to 650 nanometers.

15. A color sequencing system for receiving visible light having a significant luminance across the visible light spectrum and for selectively transmitting light with an emphasis on different portions of the spectrum, the system comprising:

a segmented color wheel having four segments, with three of the segments being primarily transmissive in only a portion of the wavelength spectrum of visible light, the portion for each of the three segments not being identical, and with a fourth segment being broadly transmissive across the wavelength spectrum of visible light, the broadly-transmissive segment having a transmittance at some wavelengths of visible light that is different from a transmittance at some other wavelengths of visible light so as to provide a desired color of light transmitted therethrough; and a base to which the color wheel is rotatable mounted;

wherein the transmission spectrum of the fourth segment is approximately 100 percent across all of the visible light spectrum except for a region having a spectral width of 150 nanometers or less in which the transmittance is approximately 90 percent.

16. A color sequencing system for receiving visible light having a significant luminance across the visible light spectrum and for selectively transmitting light with an emphasis on different portions of the spectrum, the system comprising:

a segmented color wheel having four segments, with three of the segments being primarily transmissive in only a portion of the wavelength spectrum of visible light, the portion for each of the three segments not being identical, and with a fourth segment being broadly transmissive across the wavelength spectrum of visible light, the broadly-transmissive segment having a transmittance at some wavelengths of visible light that is different from a transmittance at some other wavelengths of visible light so as to provide a desired color of light transmitted therethrough; and a base to which the color wheel is rotatable mounted;

wherein the fourth segment transmits substantial amounts of light throughout the range of 450 to 650 nanometers.

17. A color sequencing system for use in creating field sequential color images, comprising:

a light source;

a color sequencer; and a spatial light modulator;

wherein light of primarily one color band is provided during one time period from the combination of the light source and the color sequencer while the spatial light modulator displays an image corresponding to that color band;

wherein light of primarily a second color band is provided during a second time period from the combination of the light source and the color sequencer while the spatial light modulator displays an image corresponding to that second color band;

wherein light of primarily a third color band is provided during a third time period from the combination of the light source and the color sequencer while the spatial light modulator displays an image corresponding to that third color band; and wherein spectrally-broad light is provided during a fourth time period from the combination of the light source and the color sequencer while the spatial light modulator displays an image corresponding to that spectrally-broad light, further wherein while providing the spectrally-broad light the color sequencer attenuates at least a portion of the light from the light source by a non-negligible amount, wherein the spectrally-broad light includes simultaneous and substantial amounts of red, green, and blue light, wherein the spectrally-broad light has desired spectral characteristics as a result of the combination of the light source and the color sequencer.

18. A color sequencing system as defined in claim 17, wherein the color sequencer includes a segmented color wheel.

* * * * *